(12) United States Patent
Morikawa et al.

(10) Patent No.: US 7,425,032 B2
(45) Date of Patent: Sep. 16, 2008

(54) SEAL STRUCTURE

(75) Inventors: Masaaki Morikawa, Toyota (JP); Yasuaki Kawakami, Toyota (JP)

(73) Assignees: Toyota Jidosha Kabushiki Kaisha, Toyota-shi, Aichi-ken (JP); VTEC Co., Ltd., Anjo, Aichi (JP)

( * ) Notice: Subject to any disclaimer, the term of this patent is extended or adjusted under 35 U.S.C. 154(b) by 0 days.

(21) Appl. No.: 11/475,132

(22) Filed: Jun. 27, 2006

(65) Prior Publication Data

US 2006/0290168 A1    Dec. 28, 2006

(30) Foreign Application Priority Data

Jun. 27, 2005 (JP) ............................. 2005-187187

(51) Int. Cl.
*B60J 1/08* (2006.01)

(52) U.S. Cl. ................................................. 296/146.1

(58) Field of Classification Search ............. 296/146.1, 296/29, 201, 146.15, 193.06
See application file for complete search history.

(56) References Cited

U.S. PATENT DOCUMENTS

| | | | | | |
|---|---|---|---|---|---|
| 2,211,665 | A | * | 8/1940 | Mackey | 49/144 |
| 2,812,556 | A | * | 11/1957 | Renno | 296/144 |
| 2,820,993 | A | * | 1/1958 | Renno | 49/460 |
| 3,383,800 | A | * | 5/1968 | Sturtevant | 49/144 |
| 3,385,000 | A | * | 5/1968 | Sturtevant et al. | 49/440 |
| 5,566,510 | A | * | 10/1996 | Hollingshead et al. | 49/479.1 |
| 5,702,148 | A | * | 12/1997 | Vaughan et al. | 296/146.9 |
| 5,779,956 | A | * | 7/1998 | Hollingshead et al. | 264/138 |
| 6,223,470 | B1 | * | 5/2001 | Millard et al. | 49/374 |
| 6,481,162 | B2 | * | 11/2002 | Lim | 49/374 |
| 2005/0188622 | A1 | * | 9/2005 | Nestell | 49/441 |
| 2005/0223648 | A1 | * | 10/2005 | Takeuchi et al. | 49/502 |
| 2006/0059799 | A1 | * | 3/2006 | Zimmer et al. | 52/204.1 |
| 2007/0028524 | A1 | * | 2/2007 | Hiramatsu et al. | 49/475.1 |

FOREIGN PATENT DOCUMENTS

| | | |
|---|---|---|
| JP | 52-166217 | 6/1951 |
| JP | 50-43433 | 5/1975 |
| JP | 4-23519 | 2/1992 |
| JP | 11-34659 | 2/1999 |

OTHER PUBLICATIONS

Japanese Office Action dated Dec. 7, 2008.

* cited by examiner

*Primary Examiner*—Kiran B. Patel
(74) *Attorney, Agent, or Firm*—Finnegan, Henderson, Farabow, Garrett & Dunner, LLP.

(57) ABSTRACT

A seal structure includes a frame arranged on an outer periphery of a window portion of a vehicle; a division bar which is connected to the frame by tightening and divides the window portion; a seal member which provides a seal between a vehicle outer side and a vehicle inner side, between the frame and the division bar; and a transmitting portion which transmits a tightening force applied to the frame and the division bar to the seal member.

12 Claims, 15 Drawing Sheets

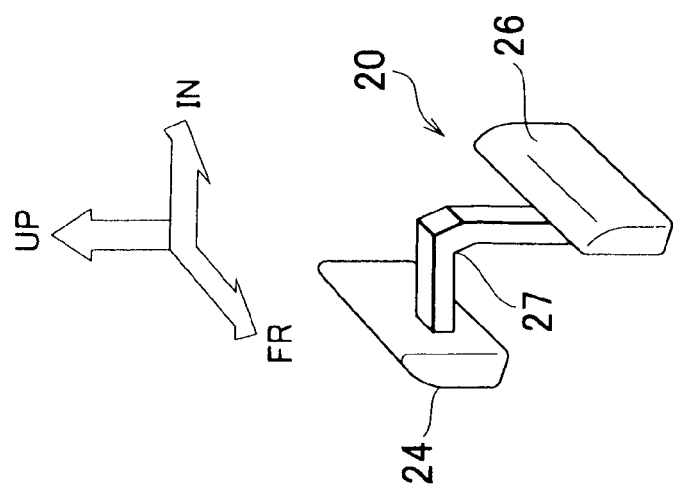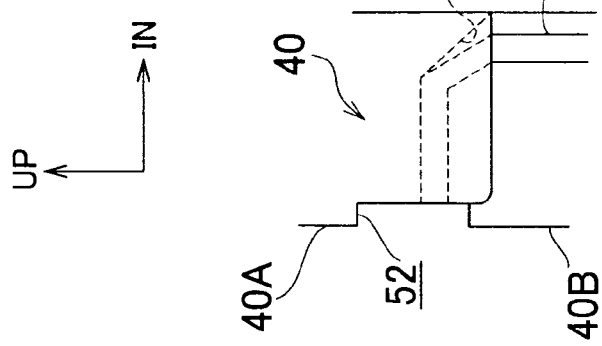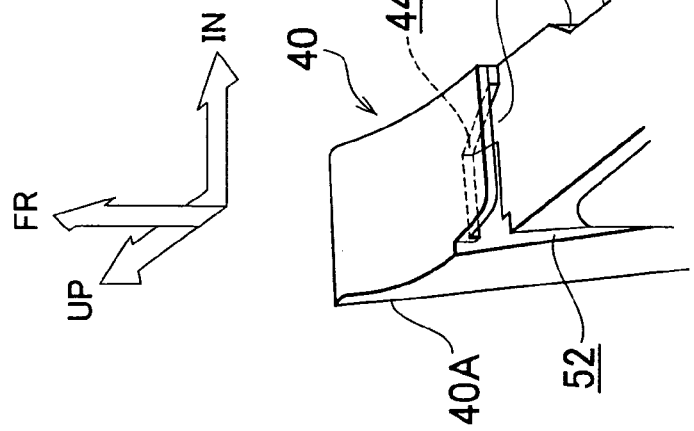

FIG. 5
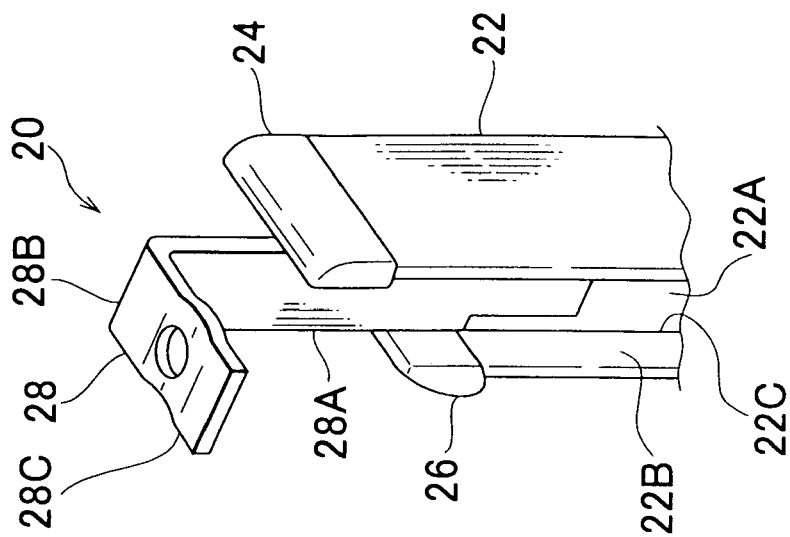
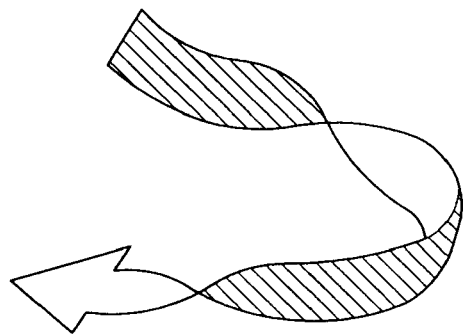
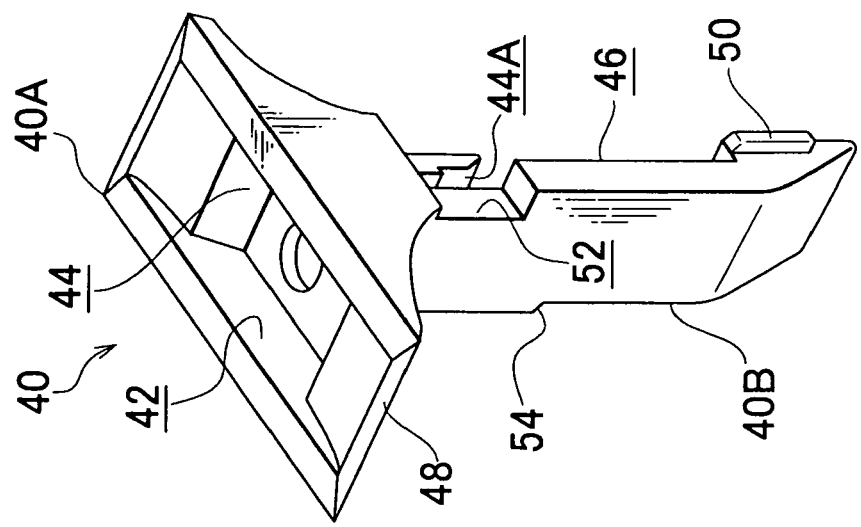

SEAL STRUCTURE

INCORPORATION BY REFERENCE

The disclosure of Japanese Patent Application No. 2005-187187 filed on Jun. 27, 2005 including the specification, drawings and abstract is incorporated herein by reference in its entirety.

BACKGROUND OF THE INVENTION

1. Field of the Invention

The invention relates to a seal structure that provides a seal between a frame on the outer periphery of a window portion of a vehicle and a division bar that separates the window portion.

2. Description of the Related Art

Japanese Utility Model Publication No. 4-23519, for example, discloses one seal structure which provides a seal between a vehicle outer side and a vehicle inner side, between a frame and a division bar, using seal members.

However, in order to this provide a seal between the vehicle outer side and the vehicle inner side of the frame and the division bar, this seal structure requires a pair of seal members, which makes the structure complex.

SUMMARY OF THE INVENTION

A seal structure according to one aspect of the invention includes a frame arranged on an outer periphery of a window portion of a vehicle; a division bar which is connected to the frame by tightening and divides the window portion; a seal member which provides a seal between a vehicle outer side and a vehicle inner side, between the frame and the division bar; and a transmitting portion which transmits a tightening force applied to the frame and the division bar to the seal member.

According to this aspect, a frame arranged on the outer periphery of a window portion of a vehicle and a division bar which divides the window portion are connected together by tightening.

In this case, a seal member provides a seal between the vehicle outer side and the vehicle inner side, between the frame and the division bar. In this way, the seal member which provides a seal between the vehicle outer side and the vehicle inner side, between the frame and the division bar is an integrated component part, which enables the structure to be simplified.

Furthermore, tightening force applied to the frame and the division bar is transmitted to the seal member by the transmitting portion, which makes it possible to increase the seal force of the seal member between the frame and the division bar. As a result, the seal performance by the seal member can be improved.

BRIEF DESCRIPTION OF THE DRAWINGS

The foregoing and/or further objects, features and advantages of the invention will become more apparent from the following description of preferred embodiments with reference to the accompanying drawings, in which like numerals are used to represent like elements and wherein:

FIG. 3A is a perspective view of a spacer of the seal structure, as viewed from the front at an angle from outside the vehicle, according to the example embodiment of the invention;

FIG. 3B is a side view of the spacer of the seal structure, as viewed from the front of the vehicle, according to the example embodiment of the invention;

FIG. 3C is a perspective view of an outer protector, an inner protector, and a connecting portion of the seal structure, as viewed from the front at an angle from inside the vehicle, according to the example embodiment of the invention;

FIG. 5 is an exploded perspective view of the division bar and the spacer of the seal structure, as viewed from the rear right of the vehicle at an angle, according to the example embodiment of the invention;

DETAILED DESCRIPTION OF THE PREFERRED EMBODIMENTS

In the following description and the accompanying drawings, the present invention will be described in more detail in terms of exemplary embodiments.

Figure 1:
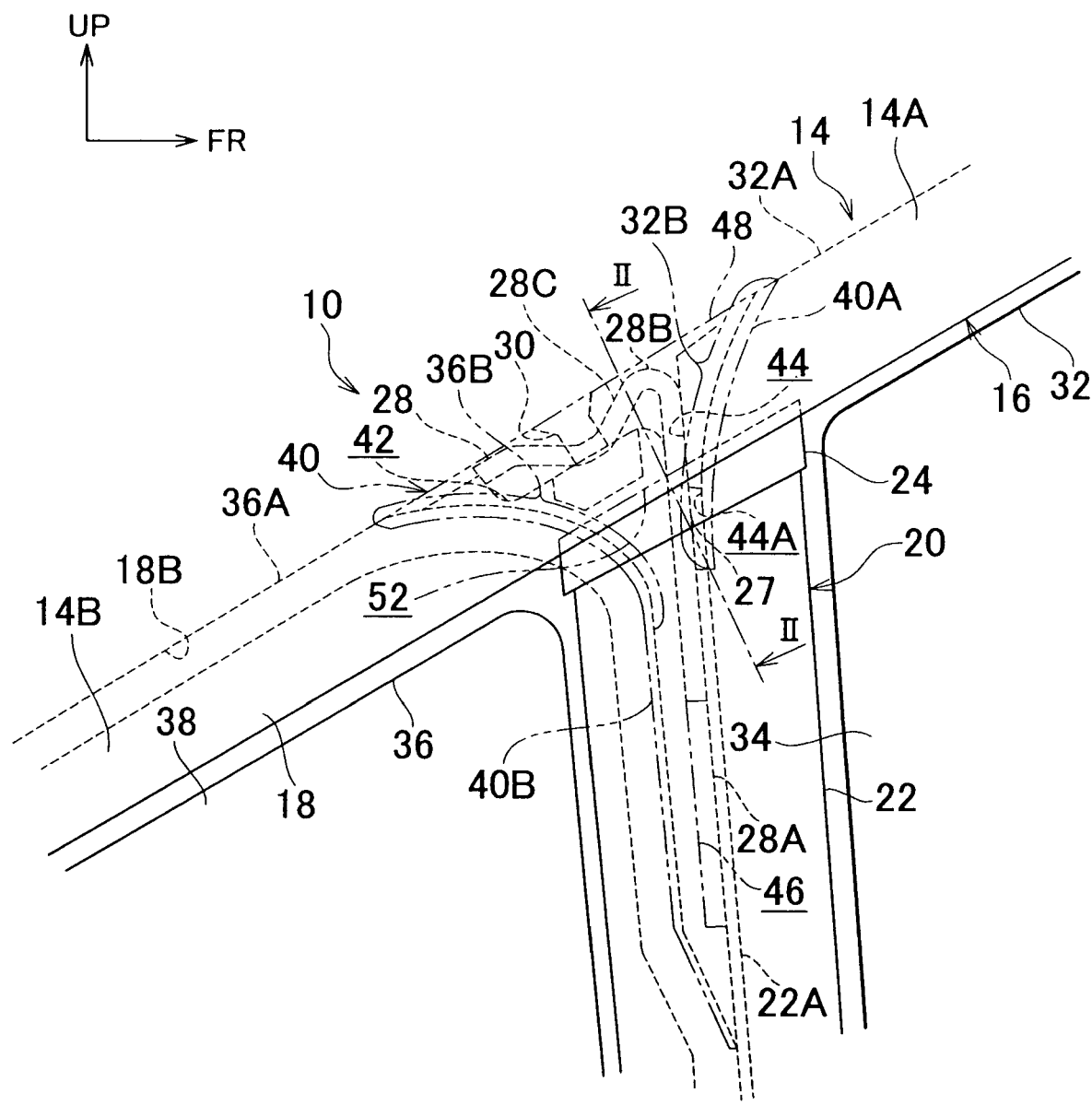
FIG. 1 is a front view of a seal structure (area A in FIG. 10), as viewed from the right side of the vehicle, according to an example embodiment of the invention.
Figure 2:
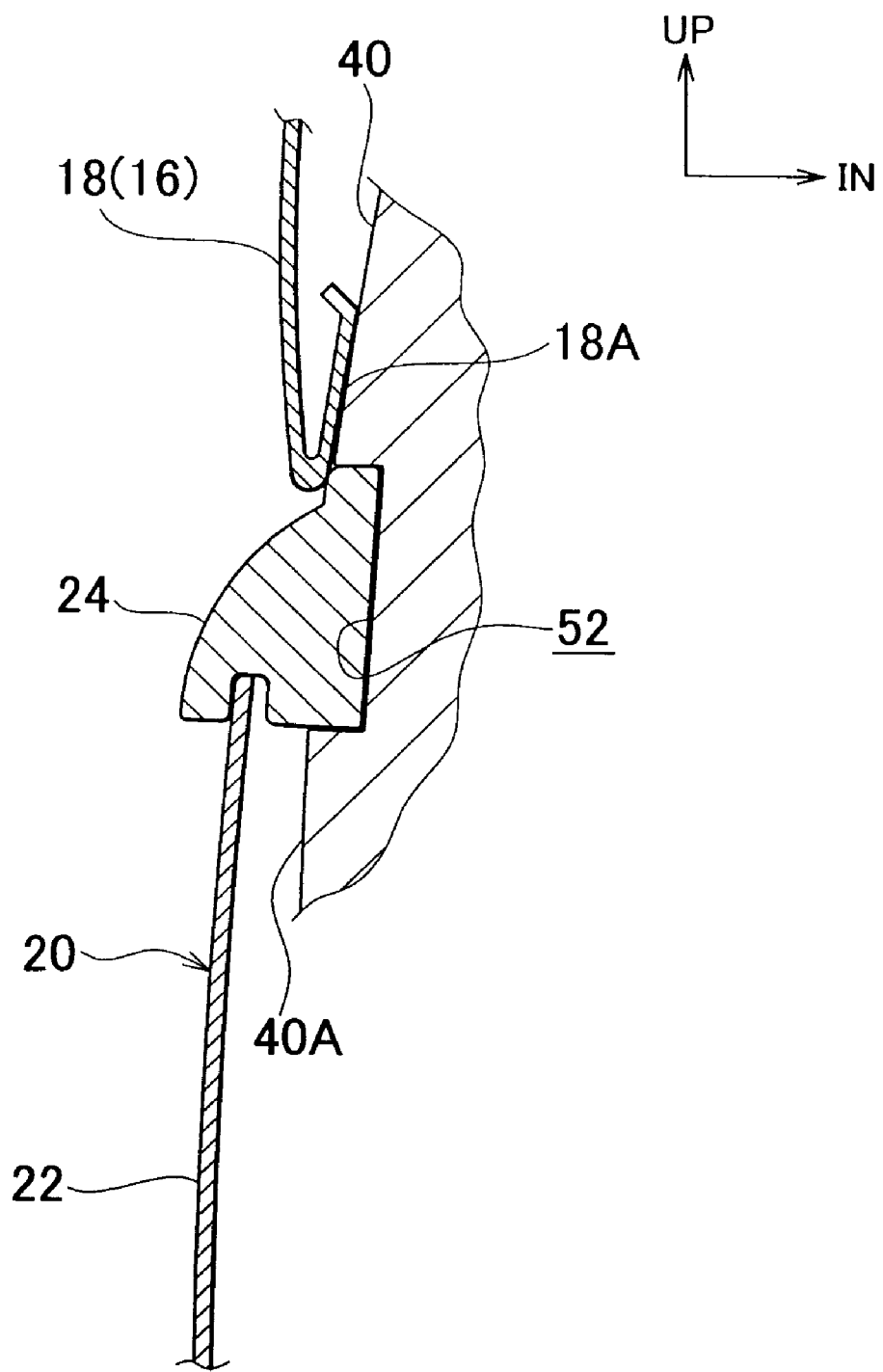
FIG. 2 is a sectional view (a cross-section taken along line II-II in FIG. 1) of a main portion of the seal structure, as viewed from the front of the vehicle, according to the example embodiment of the invention.
Figure 10:
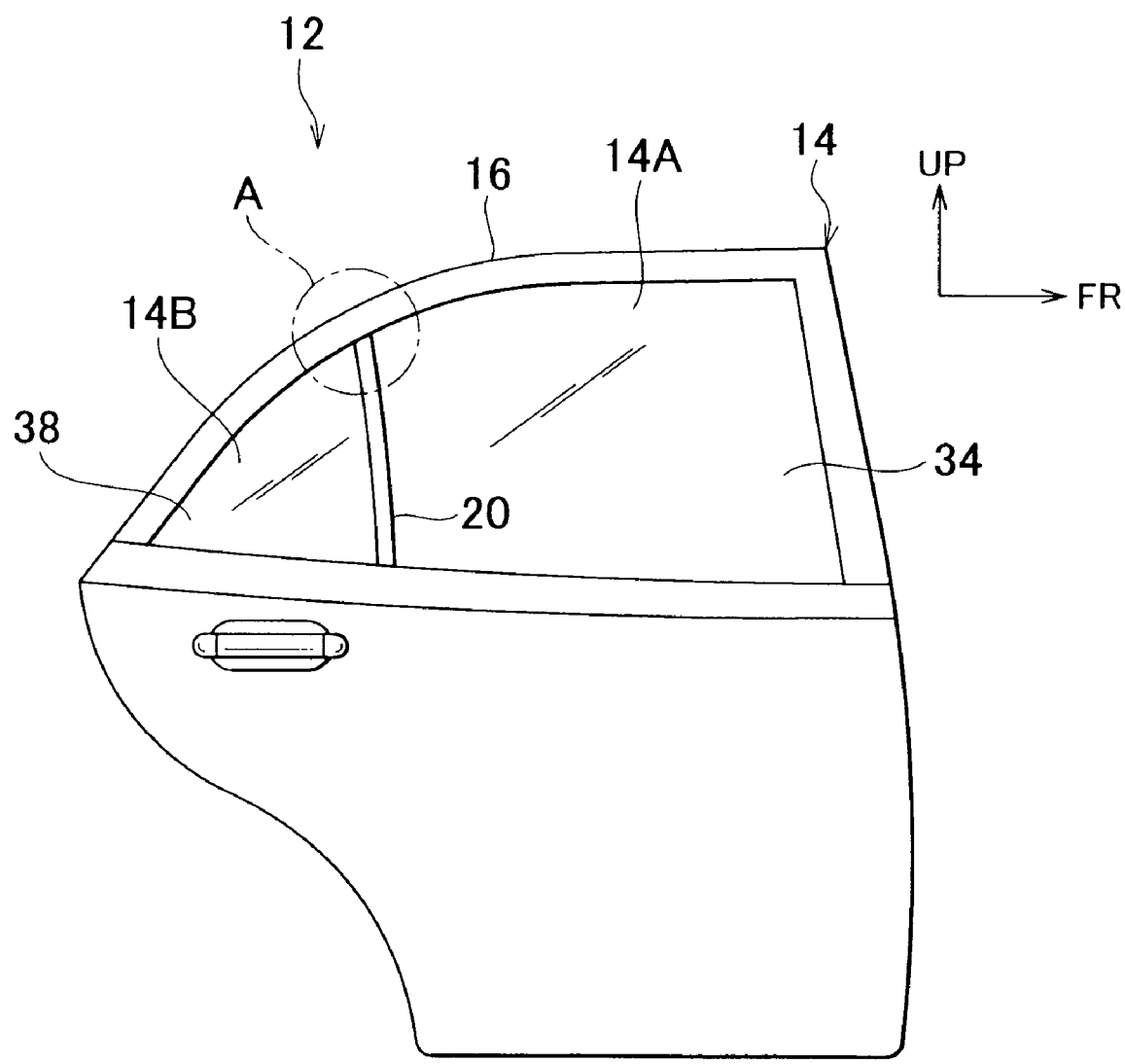
FIG. 10 is a front view of a rear door of a vehicle, as viewed from the right side of the vehicle, to which the seal structure according to the example embodiment of the invention has been applied.
Figure 11A:
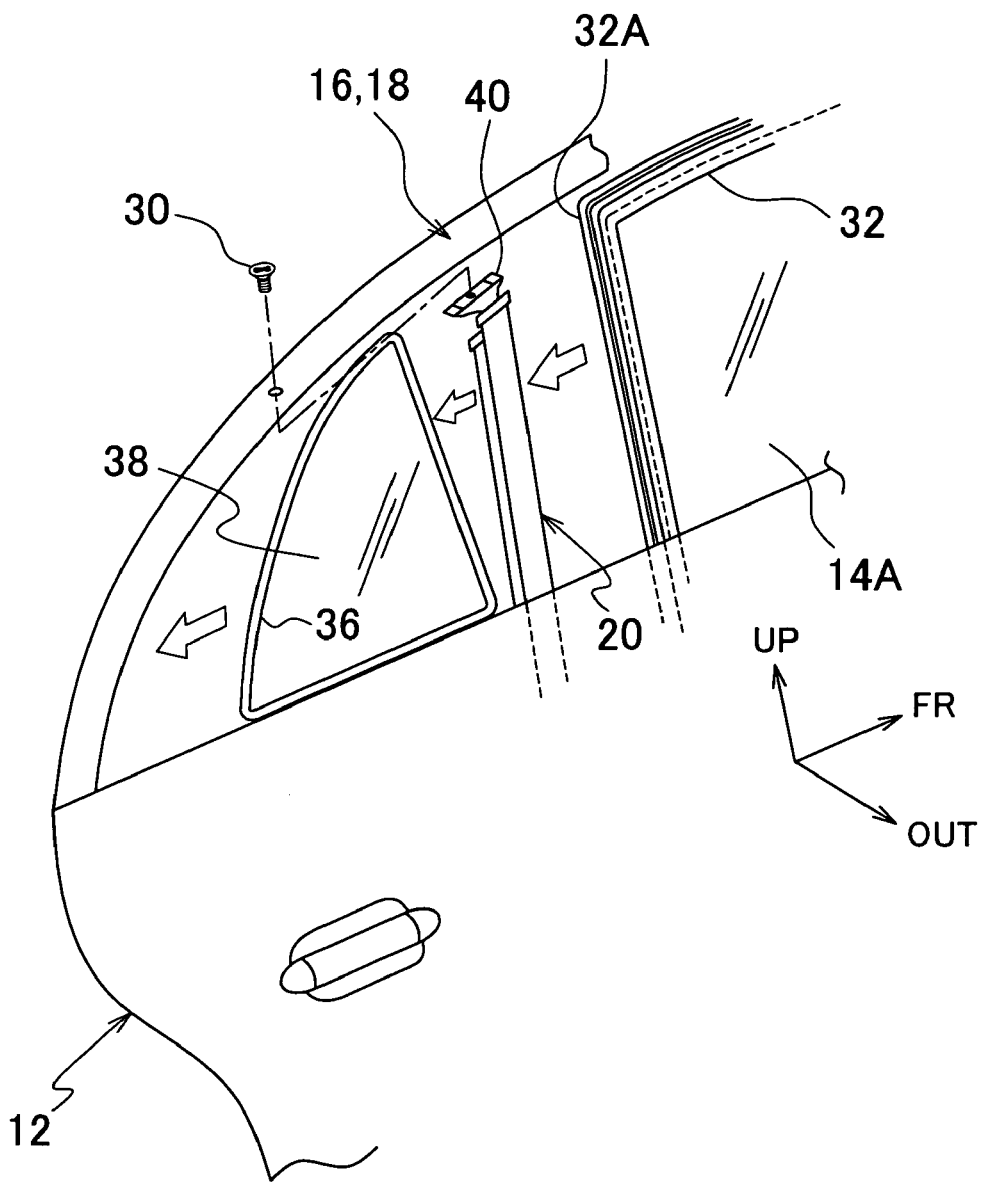
FIGS. 11A-11C are exploded part views of a seal structure, similar to FIG. 1, but depicting all of the elements of the seal structure in accordance with the preferred embodiment of the invention.
Figure 11B:
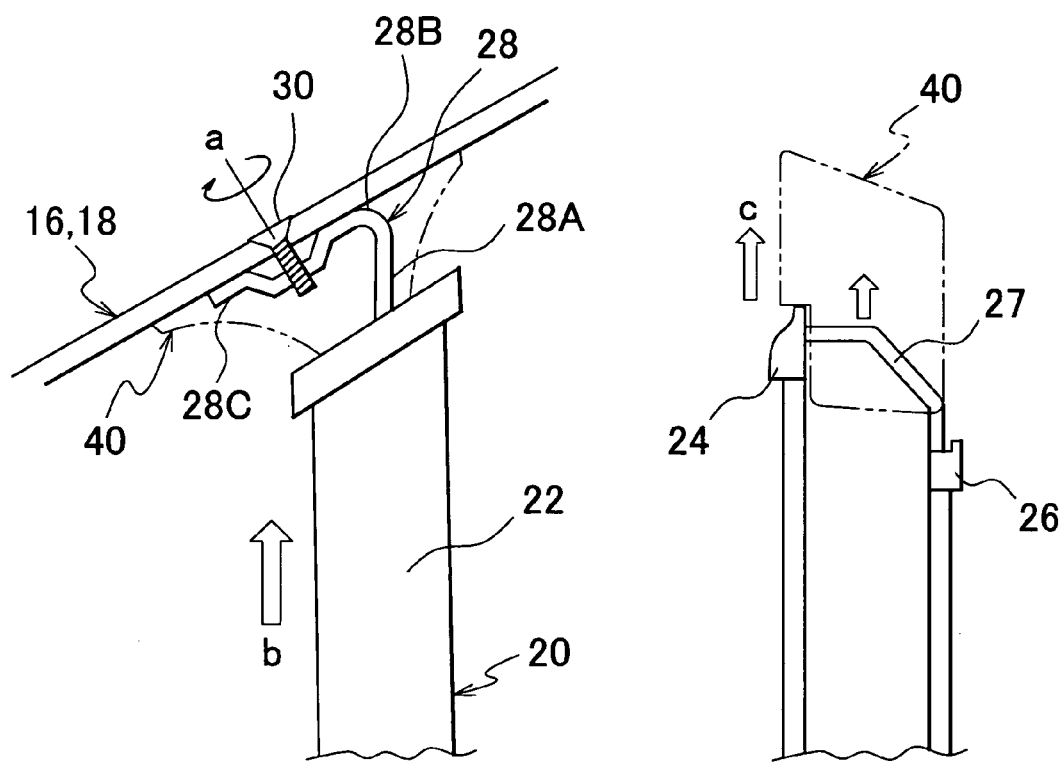
Figure 11C:
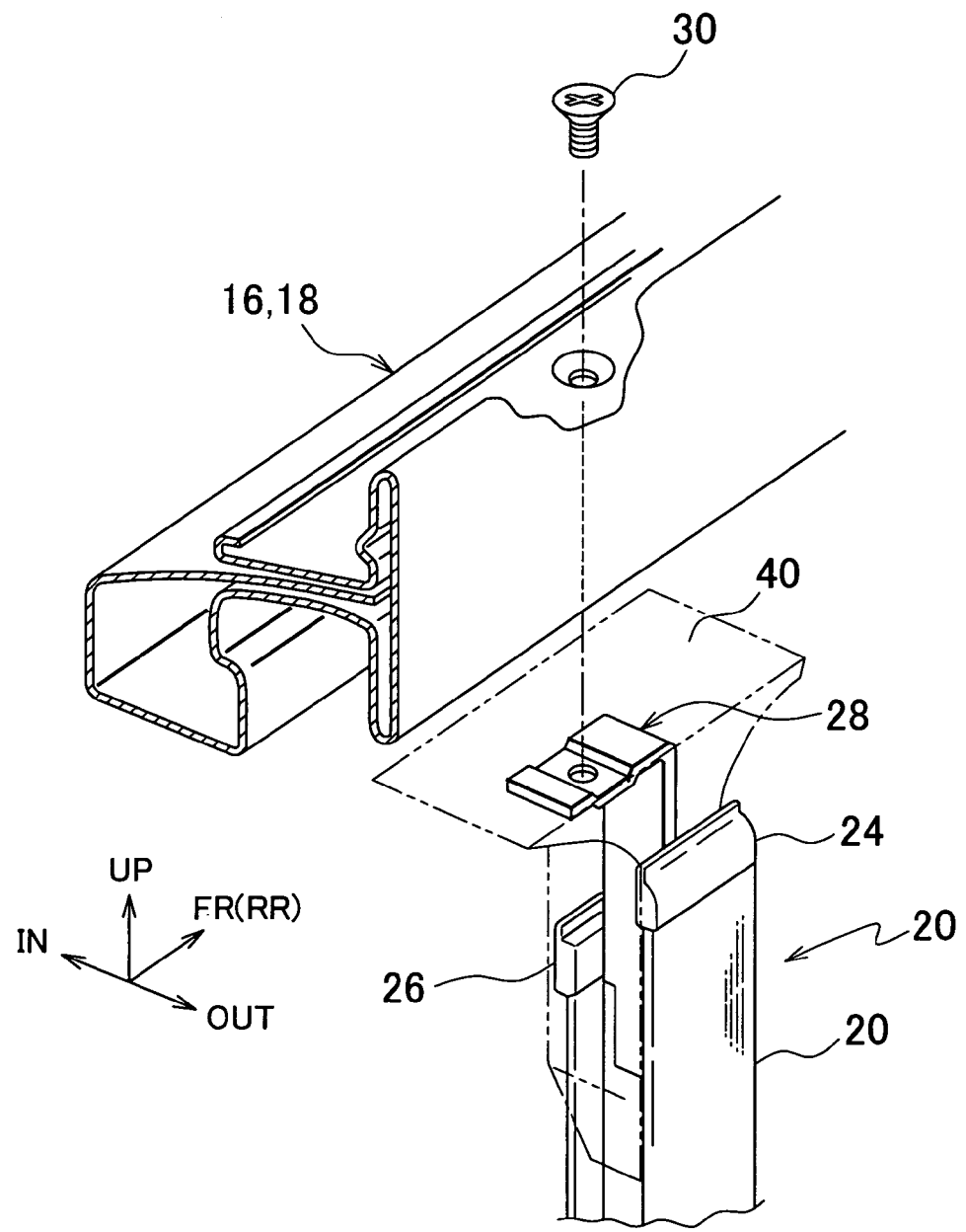

FIG. 1 is a front view of a seal structure 10, as viewed from the right side of the vehicle, according to an example embodiment of the invention. FIG. 2 is a sectional view (a cross-section taken along line II-II in FIG. 1) of a main portion of the seal structure 10 as viewed from the front of the vehicle. Further, FIG. 10 is a front view of a rear door 12 of a vehicle, as viewed from the right side of the vehicle, to which the seal structure 10 has been applied. The rear door 12 and the seal structure 10 according to this example embodiment on the right side of the vehicle are symmetrical to those on the left side of the vehicle. For simplicity, however, only those on the right side of the vehicle are shown in the drawings. Also, in the drawings, the direction toward the front of the vehicle is indicated by the arrow FR, the direction toward the inside of the vehicle (i.e., the vehicle's left) is indicated by the arrow IN, and the direction up with respect to the vehicle is indicated by the arrow UP.

The seal structure 10 according to this example embodiment is applied to a window portion 14 at an upper portion of the rear door 12. A door frame 16, which has generally inverted U-shape when viewed from the front, is provided as a frame on the outer periphery, excluding the lower end, of the window portion 14. A frame main body 18, which has a U-shaped cross-section, is formed on an inner peripheral side portion (i.e., an inside portion of the window portion 14) of the door frame 16. The frame main body 18 is open on the inner peripheral side of the door frame 16. Both end portions 18A in the width direction protrude (i.e., are bent) toward the inside such that the width of the opening decreases.

A division bar 20 is formed on the window portion 14. An upper end of this division bar 20 is fixed to the door frame 16 such that the division bar 20 divides the window portion 14 into a vehicle front side portion 14A and a vehicle rear side portion 14B.

The division bar 20 has a division bar main body 22. The upper end of this division bar main body 22 is angled along the portion of the division bar 20 that is fixed to the door frame 16. As shown in detail in FIGS. 6 and 7, the division bar main body 22 has an H-shaped cross-section, with the vehicle front side portion and the vehicle rear side portion of the division bar main body 22 having U-shaped cross-sections with a common middle wall 22A such that the vehicle front side portion is open to the front side of the vehicle and the vehicle rear side portion is open to the rear side of the vehicle. Both end portions 22B in the width direction of the vehicle rear side portion of the division bar main body 22 are bent inwards such that bent tip ends 22C come close to the middle wall 22A.

Figure 4:
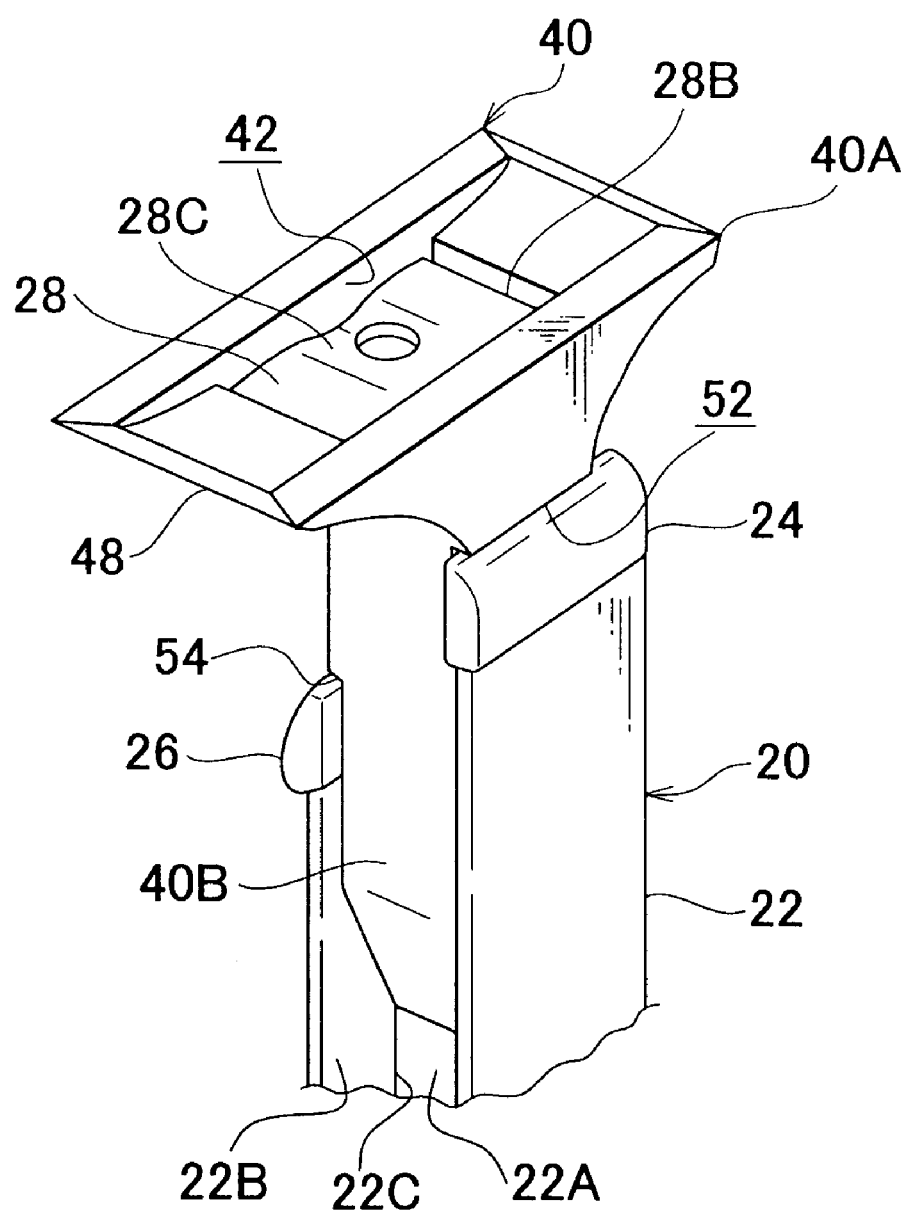
FIG. 4 is a perspective view of a division bar and a spacer of the seal structure, as viewed from the rear right of the vehicle at an angle, according to the example embodiment of the invention.

A pillar-shaped outer protector 24 is fixed to an upper end, at the vehicle outer side end, of the division bar main body 22. This outer protector 24 protrudes toward the inside (i.e., the inside of the vehicle) of the division bar main body 22. When the upper end of the outer protector 24 is arranged in the frame main body 18, it is slanted along the frame main body 18. Similarly, as shown in FIG. 4, a pillar-shaped inner protector 26 is fixed to an upper inner end, at the vehicle inner side end, of the division bar main body 22. This inner protector 26 is arranged lower than the outer protector 24 and is slanted parallel with the frame main body 18 directly above. As shown in detail in FIG. 3C, the outer protector 24 and the inner protector 26 are connected, i.e., integrated, by a rectangular pillar-shaped connecting portion 27 that is formed of hard material. This connecting portion 27 is bent in a generally inverted L shape and the middle portion in the longitudinal direction is angled downward toward the inside of the vehicle.

As shown in FIGS. 1, 5, and 11A-11C, a division bar bracket 28 is fixed to an upper portion of the middle wall 22A of the division bar main body 22. This division bar bracket 28 is arranged on the vehicle rear side of the connecting portion 27. The division bar bracket 28 is plate-shaped with a generally inverted L-shaped cross-section, and has a lower portion 28A, a curved portion 28B, and an upper portion 28C. A portion other than the upper portion of the lower portion of the division bar bracket 28 is fixed to the vehicle rear side surface of the middle wall 22A. The upper end of the lower portion 28A, the curved portion 28B, and the upper portion 28C all protrude above the outer protector 24. The upper portion 28C of the division bar bracket 28 is fixed to a bottom wall 18B (i.e., upper wall) of the frame main body 18 by tightening a bolt 30 that extends through, and is engaged with, the bottom wall 18B of the frame main body 18 from above. Accordingly, the division bar 20 is fixed to the door frame 16.

As shown in FIG. 1, a rear door glass run 32 having a U-shaped cross-section is provided as a contact member inside the frame main body 18 and the division bar 20 at a vehicle front side portion 14A of the window portion 14. The outer peripheral surface of the rear door glass run 32 functions as a seal. An outer peripheral top surface 32A of the rear door glass run 32 contacts (i.e., presses against) the bottom wall 18B of the frame main body 18 as well as contacts (i.e., presses against) the middle wall 22A of the division bar 20, except for a curved corner portion 32B at a portion where the door frame 16 connects with the division bar 20, and the like, so as to form a seal between the bottom wall 18B and the middle wall 22A.

A rear door glass 34 is provided as a window member in the rear door glass run 32. The rear door glass 34 closes the vehicle front side portion 14A of the window portion 14. The rear door glass 34 can open and close, and when opened and closed, it moves up and down guided by the rear door glass run 32 on the vehicle front side and the vehicle rear side. Also, when the rear door glass 34 is open, the outer peripheral top surface 32A of the rear door glass run 32 does contact the bottom wall 18B of the frame main body 18 and the middle wall 22A of the division bar 20, but does not press against them.

A quarter weather strip 36 having a U-shaped cross-section is provided as a contact member inside the frame main body 18 and the division bar 20 at the vehicle rear side portion 14B of the window portion 14. The outer peripheral surface of this quarter weather strip 36 functions as a seal. An outer peripheral top surface 36A of the quarter weather strip 36 contacts (i.e., presses against) the bottom wall 18B of the frame main body 18 as well as contacts (i.e., presses against) the middle wall 22A of the division bar 20, except for a curved corner portion 36B at a portion where the door frame 16 connects with the division bar 20, and the like, thus forming a seal between the bottom wall 18B and the middle wall 22A.

A quarter glass 38 is provided as a window member in the quarter weather strip 36. This quarter glass 38 closes the vehicle rear side portion 14B of the window portion 14.

The space between the bottom wall 18B of the frame main body 18, the outer peripheral top surface 32A of the rear door glass run 32, and the outer peripheral top surface 36A of the quarter weather strip 36 is filled in with a spacer 40 which serves as a seal member. The spacer 40 is formed of flexible material having a sealing function.

Figure 9:
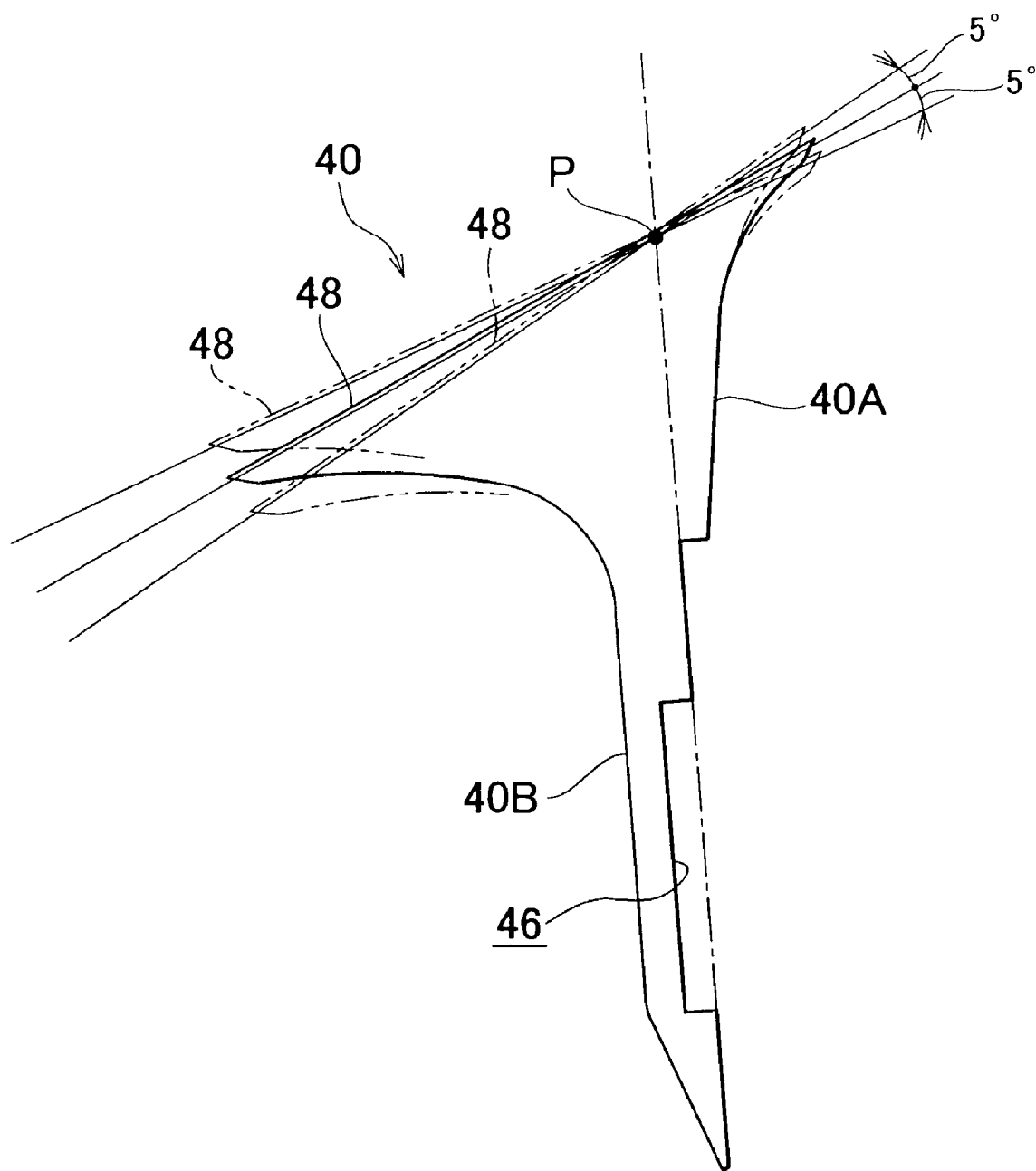
FIG. 9 is a schematic view showing the spacer of the seal structure according to the example embodiment of the invention.

The spacer 40 includes a generally inverted triangular pillar-shaped head portion 40A on the upper side and a generally rectangular pillar-shaped leg portion 40B on the lower side, which are integrally formed with each other. As shown in FIG. 9, the head portion 40A can rotate to both sides a predetermined angle (such as 5 degrees) with respect to the leg portion 40B around a central axis P that is parallel with the vehicle inside-outside direction.

A substantially rectangular parallelepiped insertion hole 42 is formed in the head portion 40A. This insertion hole 42 is open from the upper surface of the head portion 40A. A long flat communication hole 44 is also formed in the head portion 40A. This communication hole 44 provides communication between the vehicle front side end of the lower surface of the insertion hole 42 and the vehicle front side end of the lower end of the head portion 40A, and is open from both the upper and lower ends of the head portion 40A. As shown in detail in FIG. 3A, a trapezoidal plate-shaped recessed portion 44A, which forms an engaging portion that serves as transmitting means, is formed on the head portion 40A at the vehicle front side of the lower portion of the communication hole 44. The recessed portion 44A is arranged such that an upper surface thereof is horizontal and a vehicle inner side surface thereof slants downward toward the inside of the vehicle. The recessed portion 44A is open toward the vehicle outer side and the bottom.

A rectangular plate-shaped locating hole 46 is formed in the vehicle front side portion of the leg portion 40B. This locating hole 46 is communicated with the lower end of the communication hole 44 and is open to the vehicle front side.

The spacer 40 is assembled to the division bar bracket 28 by inserting the division bar bracket 28 into the insertion hole 42, the communication hole 44, and the locating hole 46 while the connecting portion 27 of the division bar 20 is arranged in the recessed portion 44A of the communication hole 44. Further, as illustrated in detail in FIG. 3B, the upper surface of the recessed portion 44A contacts (i.e., presses against) the upper surface of the upper portion of the connecting portion 27, such that a seal is formed between it and the upper portion of the connecting portion 27.

The entire periphery of the upper surface of the head portion 40A protrudes upward in a shape having a triangular (or lip-shaped) cross-section, forming a seal portion 48. This seal portion 48 contacts (i.e., presses against) the bottom wall 18B of the frame main body 18, thus forming a seal with the bottom wall 18B. The vehicle front side surface of the head portion 40A is curved corresponding to the corner portion 32B of the rear door glass run 32. The vehicle front side surface of the head portion 40A contacts (i.e., presses against) the corner portion 32B, thus forming a seal with the corner portion 32B. Similarly, the vehicle rear side surface of the head portion 40A is curved corresponding to the corner portion 36B of the quarter weather strip 36. The vehicle rear side surface of the head portion 40A contacts (i.e., presses against) the corner portion 36B, thus forming a seal with the corner portion 36B. Moreover, the vehicle front side surface of the communication hole 44 (including the vehicle front side surface of the recessed portion 44A) of the head portion 40A contacts (i.e., presses against) the connecting portion 27 of the division bar 20 and the division bar bracket 28, thus forming a seal with the connecting portion 27 and the division bar bracket 28. Similarly, the vehicle rear side surface of the communication hole 44 of the head portion 40A contacts (i.e., presses against) the division bar bracket 28 so as to form a seal therewith. Also, when the rear door glass 34 is opened, the vehicle front side surface of the head portion 40A does contact the corner portion 32B but does not substantially push against it.

The vehicle rear side surface of the locating hole 46 of the leg portion 40B contacts (i.e., presses against) the division bar bracket 28 so as to form a seal therewith. The vehicle front side surface of the lower portion of the leg portion 40B contacts (i.e., presses against) the middle wall 22A of the division bar 20 and forms a seal therewith. Similarly, the vehicle rear side surface of the leg portion 40B contacts (i.e., presses against) the quarter weather strip 36 so as to form a seal therewith.

Figure 6:
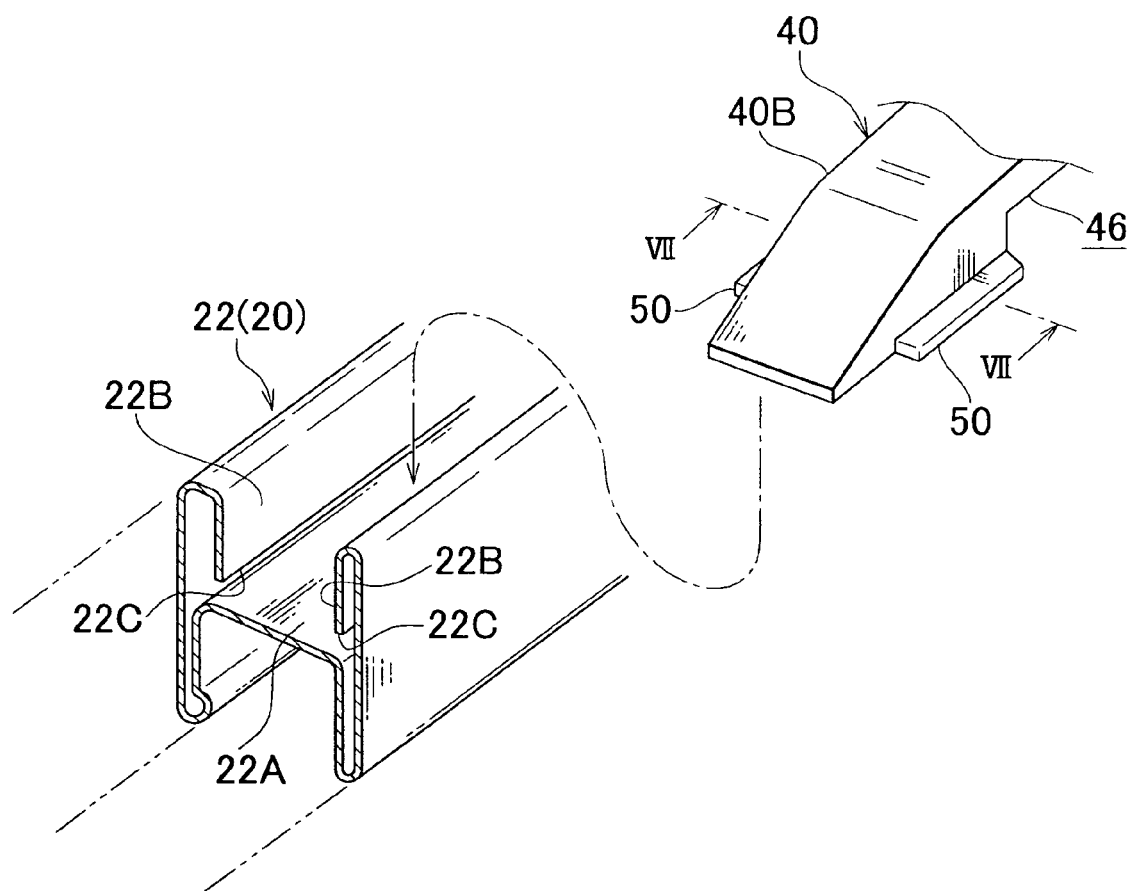
FIG. 6 is an exploded perspective view of the main body of the division bar and a lower portion of a leg portion of the spacer of the seal structure according to the example embodiment of the invention.
Figure 7:
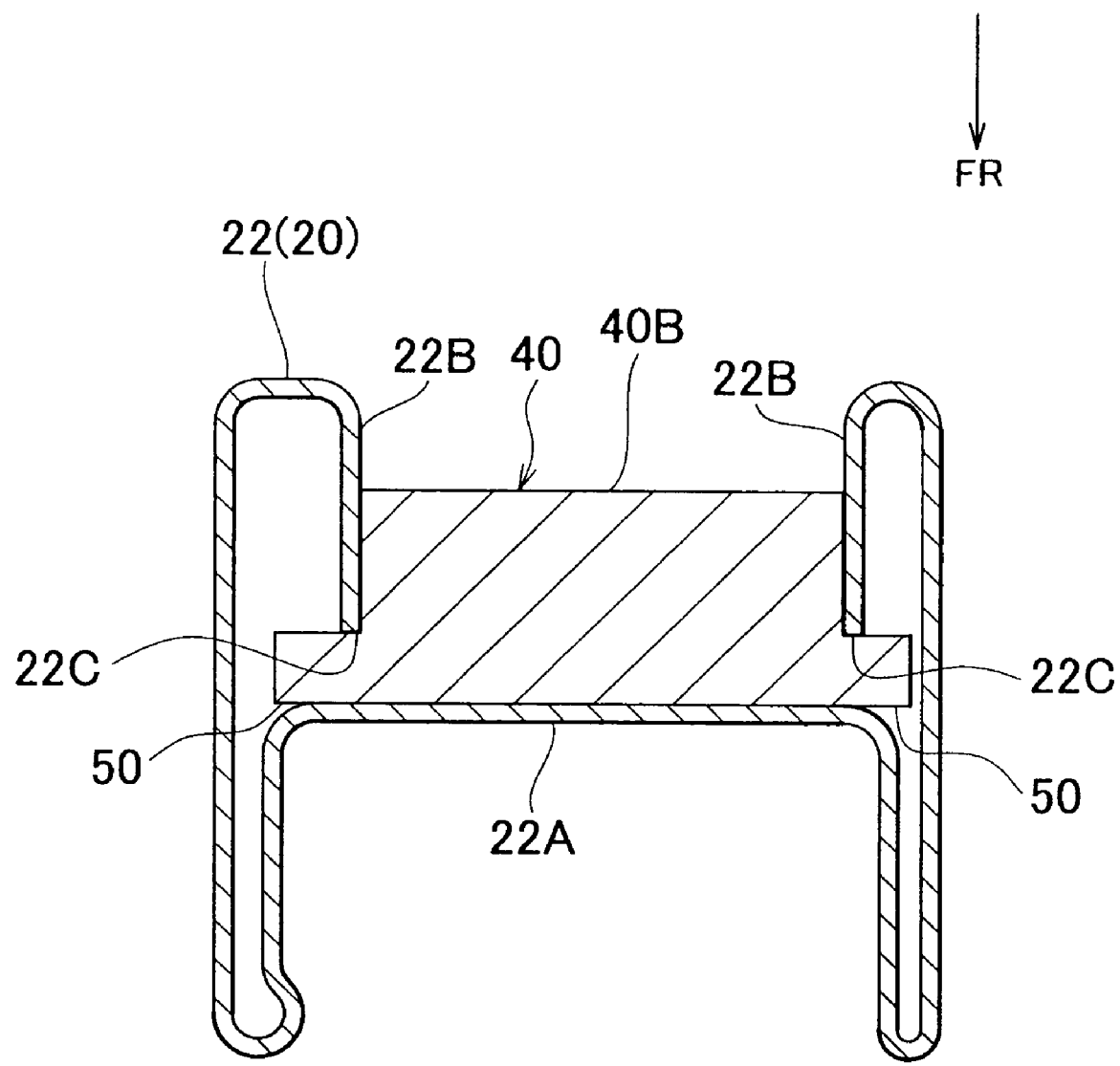
FIG. 7 is sectional view (a cross-section taken along line VII-VII in FIG. 6) showing the main body of the division bar and the lower portion of the leg portion of the spacer of the seal structure in an assembled state according to the example embodiment of the invention.

The lower portion of the leg portion 40B has a right triangle-shaped cross-section in which the vehicle rear side surface is angled toward the vehicle front side as it extends downward. This shape inhibits a gap from forming between the lower end of the leg portion 40B and the quarter weather strip 36. As shown in FIGS. 6 and 7, protruding portions 50 having rectangular cross-sections are integrally formed as retaining portions on the vehicle outer side surface and the vehicle inner side surface of the lower portion of the leg portion 40B. These protruding portions 50 engage with the curved tip ends 22C of the division bar main body 22, thereby preventing the vehicle front side surface of the lower portion of the leg portion 40B from separating from the middle wall 22A of the division bar 20.

A rectangular pillar-shaped recessed groove 52, which forms an engaging portion that serves as transmitting means, is formed in the vehicle outer side surface of the lower end of the head portion 40A. This recessed groove 52 is angled parallel with the outer protector 24. The outer protector 24 is inserted into this recessed groove 52, and the upper surface of the recessed groove 52 contacts (i.e., presses against) the outer protector 24, thus forming a seal with the outer protector 24.

As shown in FIG. 4, an angled surface 54 is formed on the vehicle inner side surface of the upper end of the leg portion 40B. This angled surface 54 is angled upward toward the inside of the vehicle. The angled surface 54 is angled parallel with the inner protector 26 and contacts (i.e., presses against) the upper surface of the inner protector 26 so as to form a seal therewith.

Next, the operation of the foregoing example embodiment will be described.

With the seal structure 10 of the structure described above, the spacer 40 provides a seal between the frame main body 18 of the door frame 16 and the outer protector 24 of the division bar 20, as well as between the frame main body 18 of the door frame 16 and the inner protector 26 of the division bar 20. Accordingly, because the spacer 40 which provides a seal between door frame 16 and the division bar 20 at both the vehicle outer side and the vehicle inner side is an integrated component part, the structure can be simplified.

Moreover, as shown in FIGS. 2, 3A-3C, 4,5, and 11A-11C, tightening force from the bolt 30 that tightens the door frame 16 and the division bar 20 (i.e., the force that pulls the division bar 20 upward to the door frame 16) together is transmitted as follows. That is, the tightening force is transmitted from the outer protector 24 of the division bar 20 to the recessed groove 42 of the spacer 40 so that the upper surface of the outer protector 24 of the division bar 20 is pressed against the top surface of the recessed groove 52 of the spacer 40. The tightening force is also transmitted from the upper portion of the connection portion 27 of the division bar 20 to the recessed portion 44A of the spacer 40 so that the upper surface of the upper portion of the connecting portion 27 of the division bar is pressed against the upper surface of the recessed portion 44A of the spacer 40. As a result, the sealing force from the spacer 40 between the door frame 16 and the division bar 20 is able to be increased, thereby enabling the seal performance by the spacer 40 to be improved. Accordingly, it is possible to prevent wind noise and rain water outside the vehicle from entering the vehicle (i.e., it is possible to improve both noise barrier performance and water shielding performance of the vehicle).

In addition, the recessed groove 52 is arranged in the vehicle outer side portion of the spacer 40, and the upper surface of the recessed portion 44A is arranged on the middle portion, in the vehicle inside-outside direction, of the spacer 40. As a result, when the bolt 30 that tightens the door frame 16 and the division bar 20 together is tightened, the tightening force presses the vehicle outer side portion of the spacer 40 against the outer protector 24, as well as presses the middle portion in the vehicle inside-outside direction of the spacer 40 against the connecting portion 27. Accordingly, the seal performance by the spacer 40 can be effectively improved, and wind noise and water outside the vehicle can be effectively prevented from entering the vehicle.

Also, the seal portion 48 of the spacer 40 provides a seal around the entire periphery of the portion where the door frame 16 (the bottom wall 18B of the frame main body 18) and the division bar 20 (the division bar bracket 28) are tightened by the bolt 30. In addition, as described above, the tightening force of the bolt 30 that tightens the door frame 16 and the division bar 20 together is transmitted in the following manner. That is, the tightening force is transmitted from the outer protector 24 of the division bar 20 to the recessed groove 52 of the spacer 40, and from the upper portion of the connection portion 27 of the division bar 20 to the recessed portion 44A of the spacer 40. As a result, it is possible to increase the sealing force of the seal portion 48 at the portion where the door frame 16 and the division bar 20 are tightened together by the bolt 30. Accordingly, the seal performance by the spacer 40 can be further improved, which makes it possible to even better prevent wind noise and rain water outside the vehicle from entering the vehicle.

Moreover, the spacer 40 contacts the rear door glass run 32 provided on the vehicle front side of the division bar 20, as well as the quarter weather strip 36 provided on the vehicle rear side of the division bar 20. As a result, the spacer 40 provides a seal between the rear door glass run 32 and the quarter weather strip 36. Accordingly, the seal performance by the spacer 40 can be improved even further, thus making it possible to even better prevent wind noise and rain water outside the vehicle from entering the vehicle.

Also, when the rear door glass 34 is opened, the spacer 40 does contact the corner portion 32B of the rear door glass run 32 but does not press on it. Therefore, it is possible to inhibit the rear door glass run 32 from lifting off of (i.e., separating from) the door frame 16 and the division bar 20 due to the spacer 40, and thus prevent from deterioration of the appearance.

Moreover, the head portion 40A of the spacer 40 is able to rotate with respect to the leg portion 40B, so the head portion 40A, which contacts the rear door glass run 32 and the quarter weather strip 36, is displaced when pressed against. As a result, even if the angle at which the door frame 16 and the division bar 20 are arranged changes due to, for example, a change in vehicle model (i.e., a difference in design) or manufacturing variation (including variations in assembly position), the spacer 40 is able to accommodate (i.e., be corrected for) that change by being pressed against the door frame 16, the rear door glass run 32, or the quarter weather strip 36. Thus, the same spacer can be used for different vehicle models.

Also, retaining the pair of protruding portions 50 on the lower portion of the leg portion 40B of the spacer 40 by the pair of curved tip ends 22C of the division bar 20 results in the vehicle front side surface of the lower portion of the leg portion 40B contacting the middle wall 22A of the division bar 20, thereby sealing the middle wall 22A. Accordingly, poor assembly of the spacer 40 to the division bar 20 can be prevented, such that wind noise from outside the vehicle can be reliably prevented from entering the vehicle. In addition, cost can be reduced compared to when double-sided tape or an adhesive is used to contact the vehicle front side surface of the lower portion of the leg portion 40B with the middle wall 22A of the division bar 20.

Furthermore, when assembling the spacer 40 to the division bar bracket 28 of the division bar 20, the spacer 40 is placed over the division bar bracket 28 while being twisted, as shown in FIG. 5, which is possible because the spacer 40 is made of flexible material.

Figure 8A:
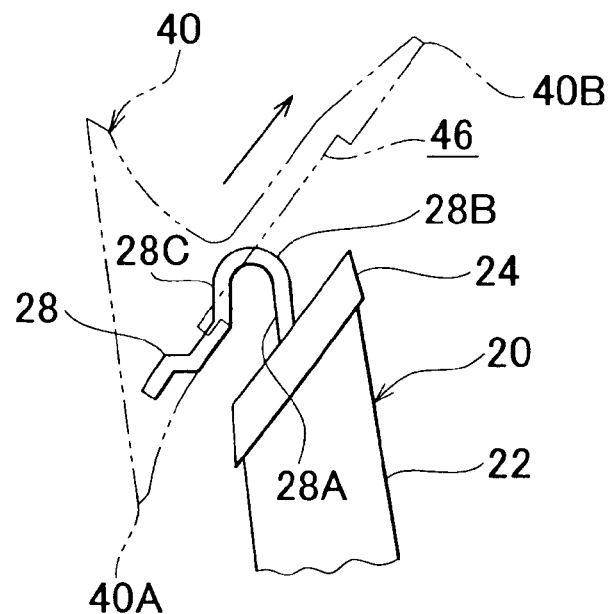
FIGS. 8A to 8F are schematic views showing the assembly of a division bar bracket and the spacer of the seal structure according to the example embodiment of the invention.
Figure 8B:
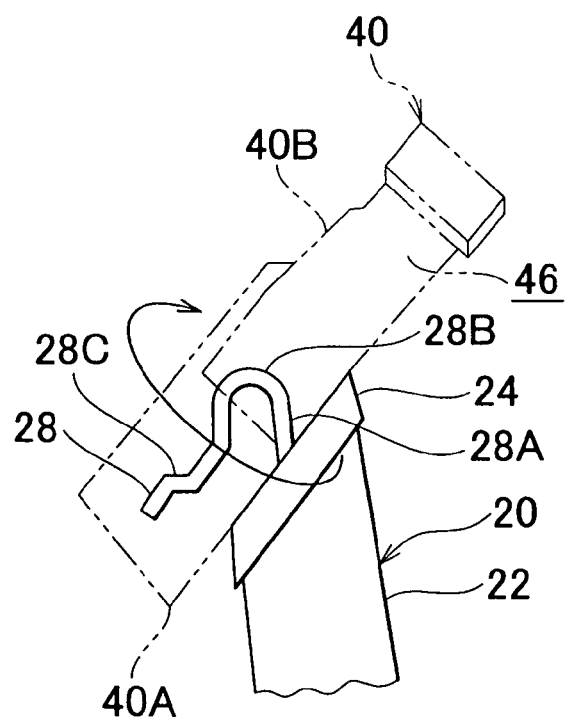
Figure 8C:
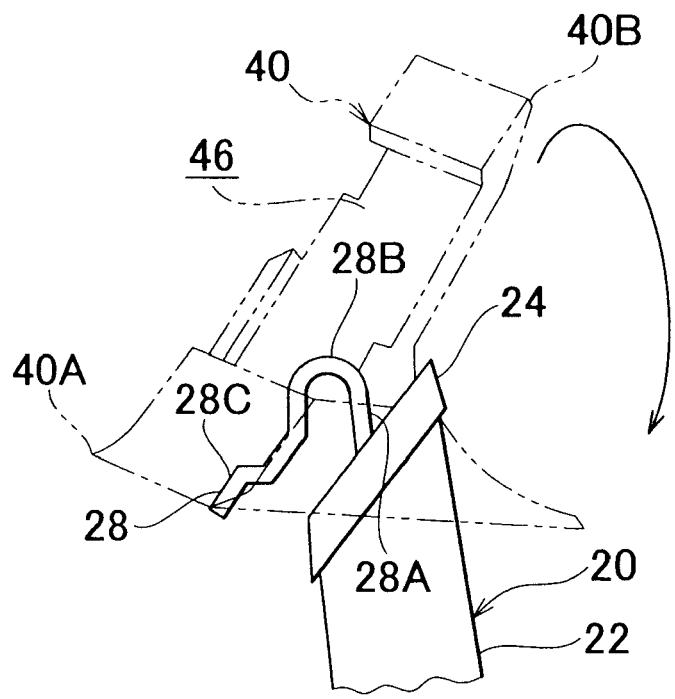
Figure 8D:
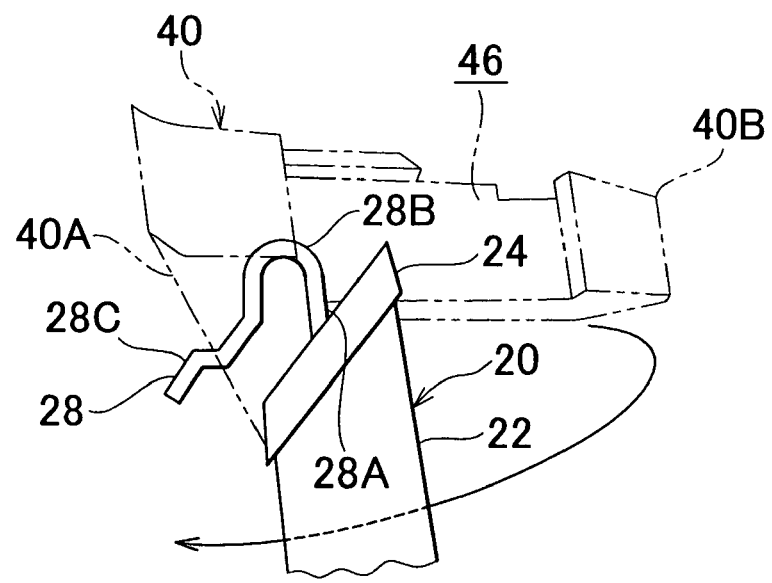
Figure 8E:
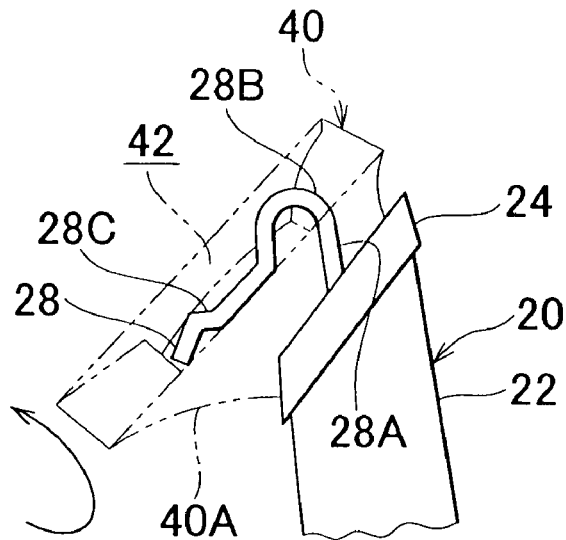
Figure 8F:
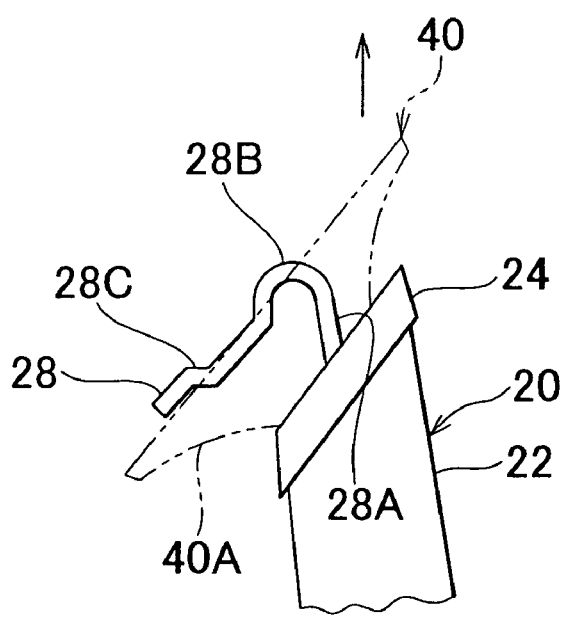

More specifically, first, as shown in FIG. 8A, the division bar bracket 28 is inserted from the locating hole 46 side into the communication hole 44 in the spacer 40 to the point where the side end of the upper portion 28C of the division bar bracket 28 does not protrude out from the spacer 40. Then, as shown in FIG. 8B, while keeping the amount that the division bar bracket 28 is inserted into the communication hole 44 the same, the spacer 40 is rotated approximately 90 degrees from the outer protector 24 side to the inner protector 26 side around the upper portion 28C of the division bar bracket 28. Next, as shown in FIG. 8C, the spacer 40 is rotated so that the division bar main body 22 side end of the communication hole 44 aligns with the curved portion 28B of the division bar bracket 28. Then, as shown in FIG. 8D, the division bar main body 22 side end of the communication hole 44 is moved along the curved portion 28B of the division bar bracket 28 and the spacer 40 is rotated. Next, as shown in FIG. 8E, the spacer 40 is rotated and the leg portion 40B of the spacer 40 is inserted between the outer protector 24 and the inner protector 26. As shown in FIG. 8F, the spacer 40 is moved to the side opposite the division bar main body 22 so that the outer protector 24 fits into the recessed groove 52 of the spacer 40. Finally, as shown in FIG. 6, the pair of protruding portions 50 on the bottom portion of the leg portion 40B are retained by the pair of curved tip ends 22C of the division bar main body 22.

In this manner, the spacer 40 can be easily assembled to the division bar bracket 28 and reliably fixed thereto without using an adhesive or double-sided tape or the like.

In the foregoing example embodiment, the spacer 40 is provided with a pair of protruding portions 50. Alternatively, however, the spacer 40 may also be provided without the pair of protruding portions 50.

Also, in the foregoing example embodiment, the upper surface of the outer protector 24 of the division bar 20 is pressed against the upper surface of the recessed groove 52 of the spacer 40, and the upper surface of the upper portion of the connecting portion 27 of the division bar 20 is pressed against the upper surface of the recessed portion 44A of the spacer 40. Alternatively, however, the structure may be such that either the upper surface of the outer protector 24 of the division bar 20 is pressed against the upper surface of the recessed groove 52 of the spacer 40, or the upper surface of the upper portion of the connecting portion 27 of the division bar 20 is pressed against the upper surface of the recessed portion 44A of the spacer 40.

Further, in the foregoing example embodiment the invention is applied to the window portion 14 of the rear door 12 of a vehicle. The invention is not limited to this, however, and may also be applied to another window portion of a vehicle.

What is claimed is:

1. A seal structure comprising:
    a door frame arranged on an outer periphery of a window portion of a vehicle;
    a division bar contacting the door frame;
    a spacer which provides a seal between the frame and the division bar;
    a tightening device applying a tightening force to the frame;
    a tightening force transmitting portion which transmits the tightening force applied to the frame to an upper portion of the division bar, and from the upper portion of the division bar to the spacer.

2. The seal structure according to claim 1, wherein the transmitting portion comprises an engaging portion that is provided on at least one of a vehicle outer side portion of the spacer and a middle portion of the spacer.

3. The seal structure according to claim 1, wherein said spacer includes a seal portion that seals a portion where the frame and the division bar are tightened together.

4. The seal structure according to claim 1, further comprising:
a contact member that is provided to a side of the division bar and contacts the spacer.

5. The seal structure according to claim 1, wherein the spacer is formed of flexible material.

6. The seal structure according to claim 4, wherein a portion of the spacer, which contacts the contact member, is displaced when pressed against.

7. The seal structure according to claim 4, wherein the contact member is a glass run.

8. The seal structure according to claim 4, wherein the contact member is a weather strip.

9. The seal structure according to claim 1, wherein the spacer is formed of a head portion which provides a seal between a vehicle outer side and a vehicle inner side within the frame, and a leg portion.

10. The seal structure according to claim 1, further comprising:
a protector fixed to an upper end of the division bar, wherein the spacer engages with the division bar via the protector.

11. The seal structure according to claim 10, wherein the protector includes an outer protector fixed to a vehicle outer side upper end of the division bar and an inner protector fixed to a vehicle inner side upper end of the division bar; and the outer protector and the inner protector are connected together by a connecting portion.

12. A seal structure comprising:
a door frame arranged on an outer periphery of a vehicle window portion;
a division bar contacting the frame by tightening;
a spacer comprising a seal member between the frame and the division bar; and
transmitting means for transmitting a tightening force applied to the frame and the division bar, by a bolt, to the seal member.

* * * * *